US008340693B2

(12) United States Patent
Chou (10) Patent No.: US 8,340,693 B2
(45) Date of Patent: *Dec. 25, 2012

(54) WIMAX BASE STATION AND METHOD FOR DETERMINING LOCATION INFORMATION FOR A MOBILE STATION IN A WIMAX NETWORK

(75) Inventor: Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 638 days.

This patent is subject to a terminal disclaimer.

(21) Appl. No.: 12/507,634

(22) Filed: Jul. 22, 2009

(65) Prior Publication Data

US 2009/0280836 A1   Nov. 12, 2009

Related U.S. Application Data

(63) Continuation of application No. 11/457,011, filed on Jul. 12, 2006, now Pat. No. 7,570,962.

(51) Int. Cl.
*H04Q 7/20* (2006.01)

(52) U.S. Cl. ............... 455/456.5; 455/456.1; 455/456.6; 342/357.08

(58) Field of Classification Search ............... 455/456.5, 455/456.1, 456.6; 342/357.08; 370/203
See application file for complete search history.

(56) References Cited

U.S. PATENT DOCUMENTS

| 6,006,097 | A | 12/1999 | Hornfeldt et al. |
|---|---|---|---|
| 6,526,039 | B1 | 2/2003 | Dahlman et al. |
| 6,636,490 | B1 | 10/2003 | Johnson |
| 6,820,031 | B1 | 11/2004 | Hayakawa |
| 6,898,197 | B1 | 5/2005 | Lavean |
| 6,944,451 | B2 | 9/2005 | Mukherjee et al. |
| 7,570,962 | B2 | 8/2009 | Chou |
| 2003/0109264 | A1 | 6/2003 | Syrjarinne et al. |
| 2003/0216140 | A1 | 11/2003 | Chambert |
| 2004/0046693 | A1* | 3/2004 | Ogino et al. ............. 342/357.08 |
| 2004/0102165 | A1 | 5/2004 | Bloebaum et al. |
| 2004/0258042 | A1 | 12/2004 | Kauhanen |
| 2005/0118948 | A1* | 6/2005 | Karabinis et al. ............ 455/12.1 |
| 2008/0014960 | A1 | 1/2008 | Chou |

FOREIGN PATENT DOCUMENTS

| WO | WO-2008008685 A2 | 1/2008 |
|---|---|---|
| WO | WO-2008008685 A3 | 1/2008 |

OTHER PUBLICATIONS

Office Action received for Korean Patent Application No. 2009-7002637, mailed on May 25, 2011, 1 page of English translation.
Office Action received for Chinese Patent Application No. 200780026369.8, mailed on May 25, 2011, 9 pages of Chinese office action including 5 pages of English translation.

(Continued)

*Primary Examiner* — Danh Le
(74) *Attorney, Agent, or Firm* — Scott M. Lane (57) ABSTRACT

Embodiments of a WiMAX base station and a method for determining current location information of a mobile station in a WiMAX network are generally described herein. In some embodiments, a first timing adjustment is determined from receipt of the ranging frame from the mobile station within the granted uplink time-slot, and a second timing adjustment is received from the non-serving base station. The second timing adjustment may be determined by the non-serving base station based on receipt of a ranging frame from the mobile station.

10 Claims, 7 Drawing Sheets

OTHER PUBLICATIONS

International Preliminary Report on Patentability received for PCT Patent Application No. PCT/US2007/072832, mailed on Jan. 22, 2009, 8 pages.

International Search Report and Written Opinion received for PCT Patent Application No. PCT/US2007/072832, mailed on Dec. 14, 2007, 12 pages.

Office Action received for Korean Patent Application No. 2009-7002637, mailed on Oct. 25, 2010, 1 page of English translation.

"Application U.S. Appl. No. 11/457,011, Notice of Allowance mailed Mar. 18, 2009", 11 pgs.

"Application U.S. Appl. No. 11/457,011, Supplemental Notice of Allowance mailed Apr. 8, 2009", 5 pgs.

\* cited by examiner

WIRELESS ACCESS NETWORK

WIMAX BASE STATION AND METHOD FOR DETERMINING LOCATION INFORMATION FOR A MOBILE STATION IN A WIMAX NETWORK

RELATED APPLICATIONS

This application is a continuation of U.S. patent application Ser. No. 11/457,011, filed on Jul. 12, 2006, now U.S. Pat. No. 7,570,962, which is incorporated herein by reference in its entirety.

TECHNICAL FIELD

Some embodiments of the present invention pertain to wireless communication networks. Some embodiments of the present invention relate to wireless access networks.

BACKGROUND

Many wireless networks, such as wireless access networks, may provide many types of wireless services, including allowing mobile stations to communicate voice, such as voice over internet protocol (VoIP). Current location information for a mobile station may need to be provided by these networks in the event of an emergency. Some regulatory agencies may even require that current location information be available when communicating voice. Some conventional mobile stations use the global positioning system (GPS) to determine their location, but GPS circuitry is expensive, takes up space, and consumes significant power. These are significant drawbacks for mobile stations that are portable and/or battery powered.

Thus, there are general needs for wireless access networks and methods for determining current location information of a mobile station operating in a wireless access network without additional and/or expensive circuitry, and without the consumption of significant power. There are also general needs for wireless access networks that can provide current location information of a mobile station in the event of an emergency.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
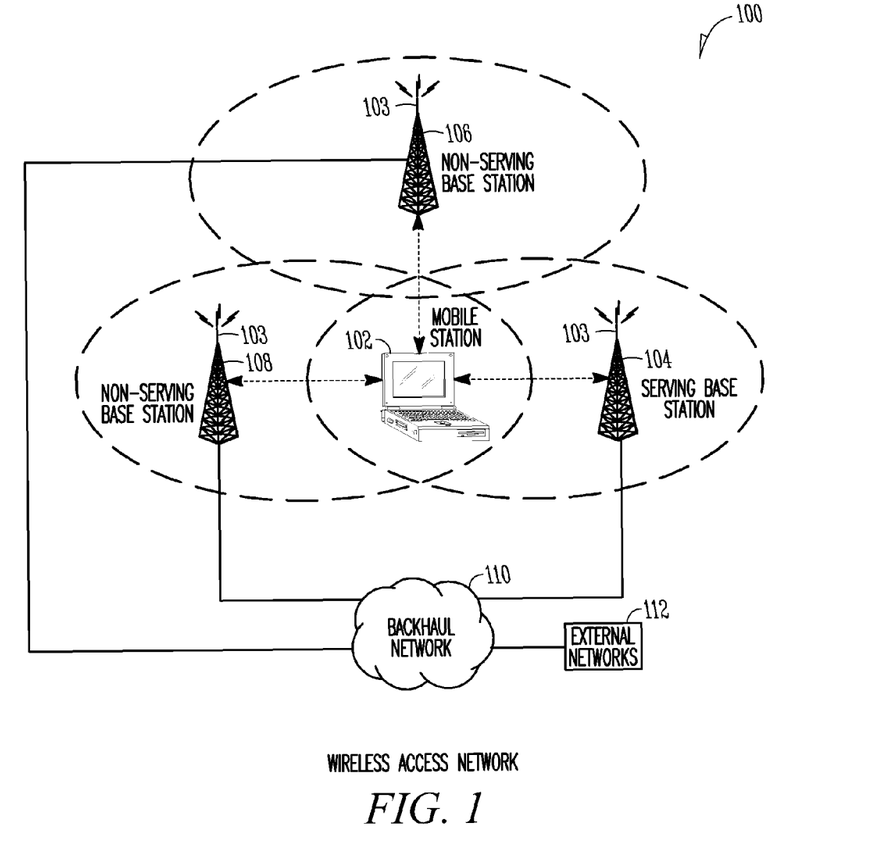
FIG. 1 illustrates a wireless access network in accordance with some embodiments of the present invention.

FIG. 1 illustrates a wireless access network in accordance with some embodiments of the present invention. Wireless access network 100 may include a plurality of base stations, such as base stations 104, 106 and 108, that provide wireless communications for one or more mobile stations, such as mobile station 102. Base stations 104, 106 and 108 may communicate through backhaul network 110 which may be coupled to external networks 112. Base stations 104, 106 and 108 may allow mobile station 102 to communicate with devices accessible through external networks 112 as well as other mobile stations within wireless access network 100. As illustrated in FIG. 1, when mobile station 102 is communicating with base station 104 and is currently associated with base station 104, base station 104 may be referred to as a serving base station. Other base stations, such as base stations 106 and 108, may be referred to as non-serving base stations.

In accordance with some embodiments of the present invention, current location information for mobile station 102 may be determined by serving base station 104 using uplink time-difference of arrival (U-TDOA) measurements. In some embodiments, the current location information may be available by external networks 112 in the event of an emergency.

In accordance with some embodiments, serving base station 104 may inform non-serving base station 106 of ranging frame parameters for mobile station 102 to use when transmitting a ranging frame. Serving base station 104 may initiate autonomous ranging by sending an initiate ranging message to mobile station 102. Mobile station 102 may responsively transmit the ranging frame within a granted uplink time-slot in accordance with the ranging frame parameters.

In some embodiments, the initiate ranging message sent by serving base station 104 to mobile station 102 may comprise an autonomous ranging response (RNG-RSP) message, and the ranging frame sent by mobile station 102 may comprise a ranging request (RNG-REQ) message. In these embodiments, the autonomous RNG-RSP message sent by serving base station 104 may force mobile station 102 to responsively send the RNG-REQ message within the granted uplink time-slot. In these embodiments, wireless access network 100 may operate in accordance with one of the IEEE 802.16 standards and/or proposed specifications referenced below. In these embodiments, the RNG-REQ and the RNG-RSP message may be configured in accordance with these standards or proposed specifications, although the scope of the invention is not limited in this respect. In some embodiments, the initiate ranging message may be an autonomous response message forcing mobile station 102 to send the ranging frame, although the scope of the invention is not limited in this respect.

In some embodiments, the initiate ranging message sent by serving base station 104 may include a timing advance ($t_a$) and may include ranging frame parameters. Serving base station 104 may determine a first timing adjustment ($t_1$) from the receipt of the ranging frame from mobile station 102 within the granted uplink time-slot. Serving base station 104 may receive a second timing adjustment ($t_2$) from non-serving base station 106. The second timing adjustment may have been determined by non-serving base station 106 based on receipt of the ranging frame from mobile station 102. In some embodiments, the second timing adjustment may be received by serving base station 104 through backhaul network 110, although the scope of the invention is not limited in this respect.

In some of these embodiments, serving base station 104 may grant the uplink time-slot to mobile station 102 for use when transmitting the ranging frame. Serving base station 104 may also generate a first U-TDOA parameter ($T_1$) from the timing advance and the first and second timing adjustments. The first U-TDOA parameter may be used determine the current location information for mobile station 102 with respect to serving base station 104. These embodiments are also discussed in more detail below. When a second non-serving base station is available, such as a non-serving base station 108, a similar process may be performed with second non-serving base station 108 to generate a second U-TDOA parameter ($T_2$). In these embodiments, the first and second U-TDOA parameters may both be used to determine the current location information for mobile station 102. These embodiments are also discussed in more detail below.

In some embodiments, serving base station 104, non-serving base station 106 and/or non-serving base station 108 may utilize the same set of frequencies to communicate with mobile stations. In these embodiments, the same ranging frame may be used by serving base station 104, non-serving base station 106 and/or non-serving base station 108 to determine timing adjustments. These embodiments are discussed in more detail below in reference to FIG. 6A.

In some other embodiments, serving base station 104, non-serving base station 106 and/or non-serving base station 108 may use different sets of frequencies to communicate with mobile stations. In these embodiments, mobile station 102 may transmit different ranging frames to serving base station 104, non-serving base station 106 and/or non-serving base station 108. These embodiments are discussed in more detail below in reference to FIG. 6B.

In some embodiments, mobile station 102, the serving base station 104 and non-serving base stations 106 and 108 may operate substantially synchronously by employing a multiple access technique, such as orthogonal frequency division multiple access (OFDMA), although the scope of the invention is not limited in this respect.

Base stations 104, 106 and 108 may communicate with mobile station 102 using one or more antennas 103. Antennas 103 may comprise one or more directional or omnidirectional antennas, including, for example, dipole antennas, monopole antennas, patch antennas, loop antennas, microstrip antennas or other types of antennas suitable for transmission of radio-frequency (RF) signals. In some embodiments, base stations may use sectorized antennas to provide non-interfering communications within different sectors. These sectorized embodiments are discussed in more detail below.

Figure 2:
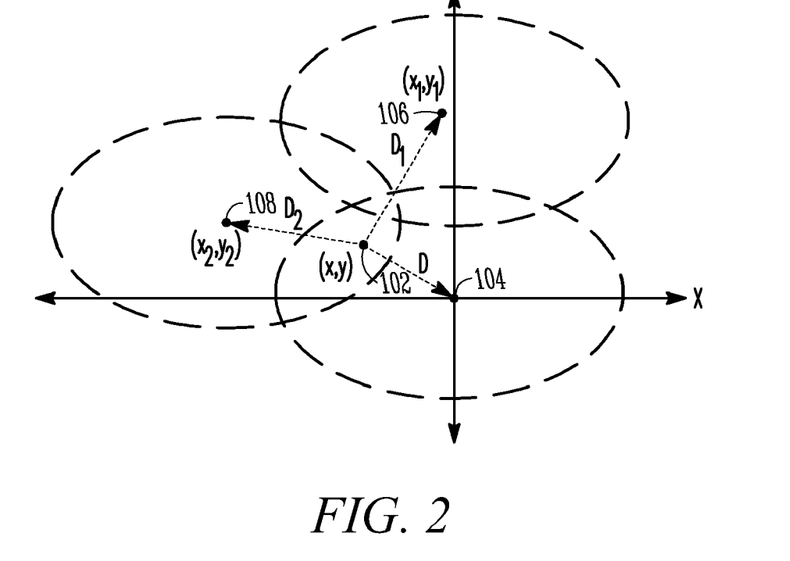
FIG. 2 illustrates the determination of current location information of a mobile station using two non-serving base stations in accordance with some embodiments of the present invention.

FIG. 2 illustrates the determination of current location information of a mobile station using two non-serving base stations in accordance with some embodiments of the present invention. In FIG. 2, mobile station 102 may correspond to mobile station 102 (FIG. 1), serving base station 104 may correspond to serving base station 104 (FIG. 1), non-serving base station 106 may correspond to non-serving base station 106 (FIG. 1), and non-serving base station 108 may correspond to non-serving base station 108 (FIG. 1). As illustrated, non-serving base station 106 may be located at coordinates ($x_1$, $y_1$) with respect to serving base station 104, and non-serving base station 108 may be located at coordinates ($X_2$, $y_2$) with respect to serving base station 104. The current location information for mobile station 102 at coordinates (x, y) is illustrated as being distance D from serving base station, distance $D_1$ from non-serving base station 106, and distance $D_2$ from non-serving base station 108. Distances D, $D_1$ and $D_2$ may be determined from the timing advance, the first timing adjustment determined by serving base station 104, the second timing adjustment provided by non-serving base station 106 and/or a third timing adjustment provided non-serving base station 108. Some embodiments that use two or more non-serving base stations, in addition to serving base station 104, to determine the current location information for mobile station 102 are discussed in more detail below.

Figure 3:
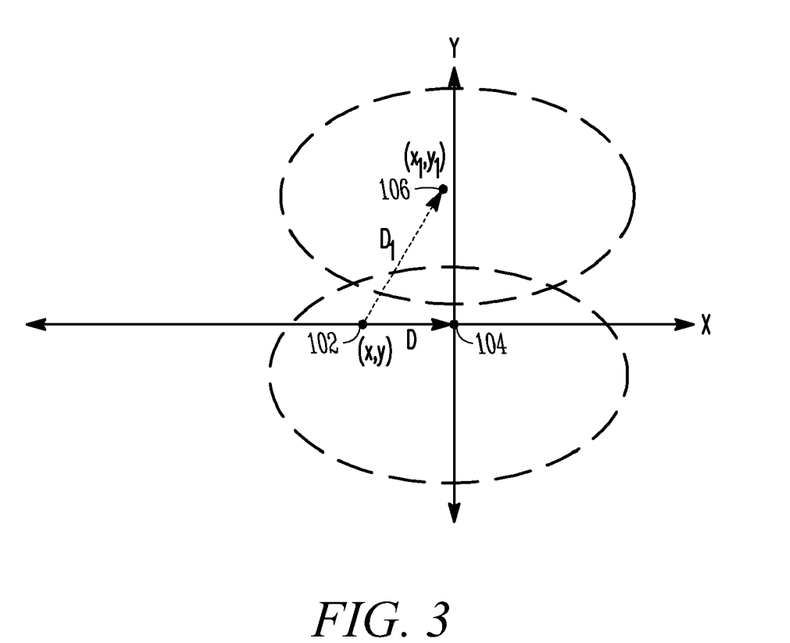
FIG. 3 illustrates the determination of current location information of a mobile station using one non-serving base station in accordance with some embodiments of the present invention.

FIG. 3 illustrates the determination of current location information for a mobile station using one non-serving base station in accordance with some embodiments of the present invention. In FIG. 3, mobile station 102 may correspond to mobile station 102 (FIG. 1), serving base station 104 may correspond to serving base station 104 (FIG. 1), and non-serving base station 106 may correspond to non-serving base station 106 (FIG. 1).

In these embodiments, the current location information for mobile station 102 is determined using serving base station 104 and non-serving base station 106. In these embodiments, the coordinate axis may be mathematically rotated to place mobile station 102 on one of the coordinate axis as shown. Accordingly, the current location information for mobile station 102 may be determined using one non-serving base station rather than more than one non-serving base station. Some embodiments that use a single non-serving base station, in addition to serving base station 104, to determine the current location information for mobile station 102 are discussed in more detail below.

Figure 4A:
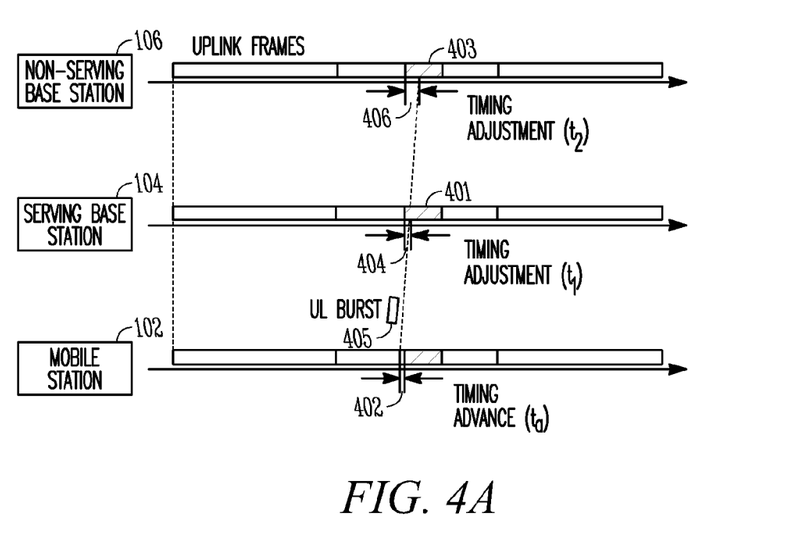
FIGS. 4A and 4B illustrate the measurement of uplink time-difference of arrival (U-TDOA) measurements in accordance with some embodiments of the present invention.
Figure 4B:
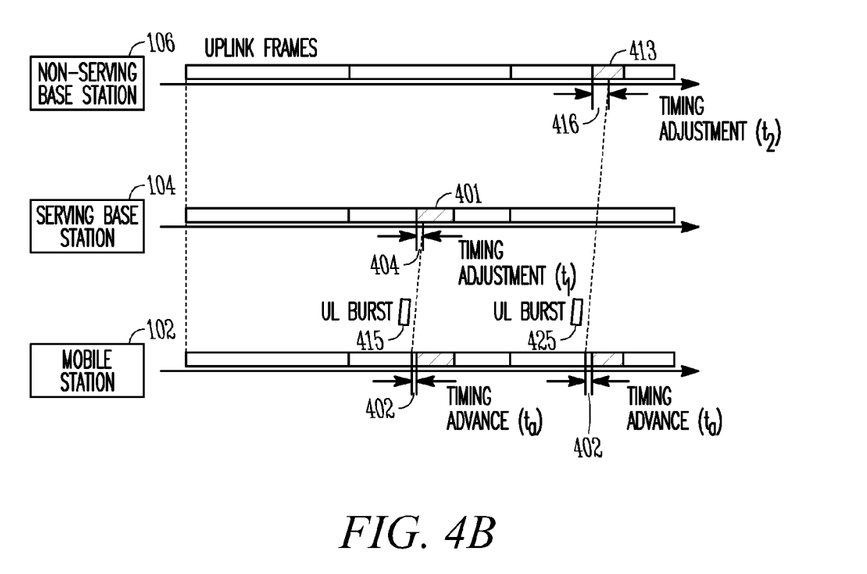

FIGS. 4A and 4B illustrate the measurement of U-TDOA measurements in accordance with some embodiments of the present invention. In FIGS. 4A and 4B, mobile station 102 may correspond to mobile station 102 (FIG. 1), serving base station 104 may correspond to serving base station 104 (FIG. 1), and non-serving base station 106 may correspond to non-serving base station 106 (FIG. 1). FIG. 4A illustrates the measurement of U-TDOA measurements in accordance with embodiments of the present invention in which base stations 104 and 106 utilize the same frequencies for communicating with mobile stations. FIG. 4B illustrates the measurement of U-TDOA measurements in accordance with embodiments of the present invention in which base stations 104 and 106 employ frequency diversity for communicating with mobile stations. Communications with a second non-serving base station, such as non-serving base station 108 (FIG. 1), are not illustrated in FIGS. 4A and 4B.

As illustrated in FIG. 4A, mobile station 102 transmits a ranging frame within uplink (UL) burst 405 to serving base station 104 for receipt within uplink time-slot 401, and to non-serving base station 106 for receipt with uplink time-slot 403. In these embodiments, the frames of serving base station 104 and non-serving base station 106 may be synchronized, and mobile station 102 may transmit the ranging frame with timing advance 402 with respect to the granted time-slot. The ranging frame may be received at serving base station 104 within uplink time-slot 401, allowing first timing adjustment 404 (illustrated as $t_1$) to be calculated. The ranging frame may be received at non-serving base station 106 allowing second timing adjustment 406 (illustrated as $t_2$) to be calculated. In some embodiments when a second non-serving base station, such as non-serving base station 108 (FIG. 1), is used, the ranging frame may also be received at the second non-serving base station allowing a third timing adjustment (e.g., $t_3$) to be calculated.

As illustrated in FIG. 4B, mobile station 102 transmits a first ranging frame within uplink burst 415 to serving base station 104 for receipt within uplink time-slot 401. Mobile station 102 also transmits a second ranging frame within uplink burst 425 to non-serving base station 106 for receipt with uplink time-slot 413. In these embodiments, the first ranging frame may be received at serving base station 104 within uplink time-slot 401, allowing first timing adjustment 404 (illustrated as $t_1$) to be calculated, and the second ranging frame may be received at non-serving base station 106 allowing second timing adjustment 416 (illustrated as $t_2$) to be calculated. In some embodiments when a second non-serving base station, such as non-serving base station 108 (FIG. 1), is used, a third ranging frame may be transmitted by mobile station 102 for receipt by the second non-serving base station allowing a third timing adjustment (e.g., $t_3$) to be calculated. As illustrated in FIG. 4B, uplink bursts 415 and 425 may be transmitted with timing advance 402.

Figure 5:
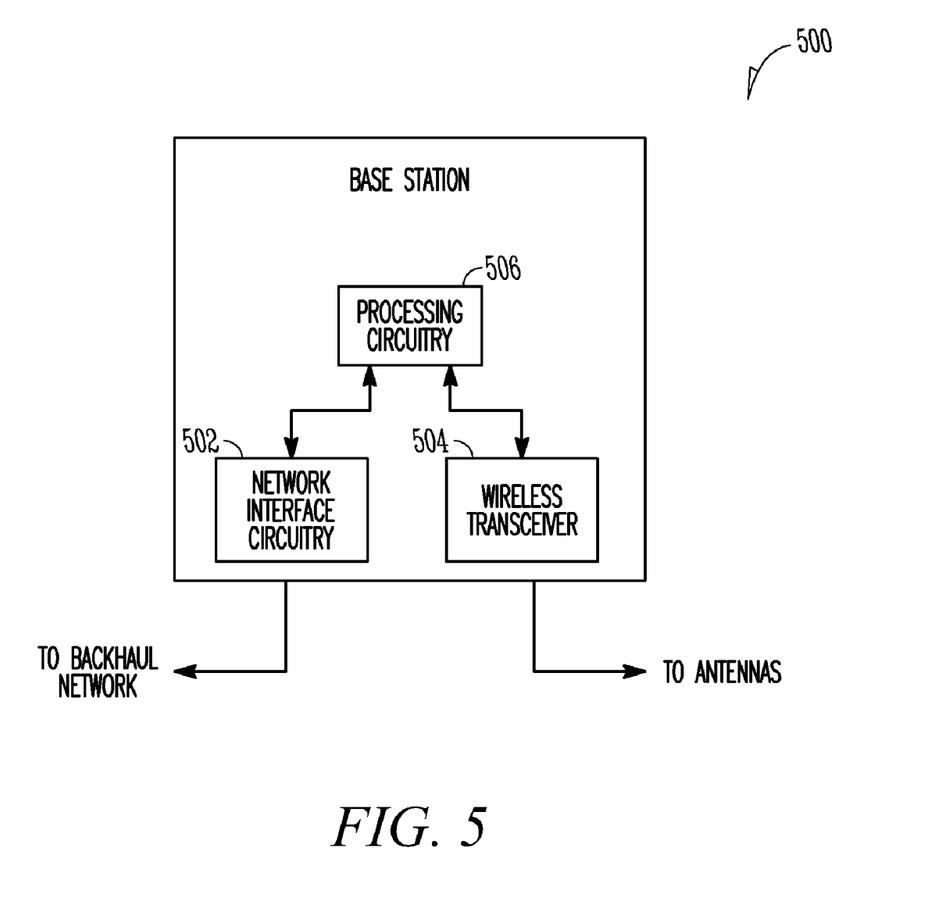
FIG. 5 is a block diagram of a base station in accordance with some embodiments of the present invention.

FIG. 5 is a block diagram of a base station in accordance with some embodiments of the present invention. Base station 500 may be suitable for use as serving base station 104 (FIG. 1), non-serving base station 106 (FIG. 1) and/or non-serving base station 108 (FIG. 1). Base station 500 includes network interface circuitry 502 for interfacing with networks such as backhaul network 110 (FIG. 1), wireless transceiver 504 for communicating with one or more mobile stations, such as mobile station 102 (FIG. 1), and processing circuitry 506 to perform various operations described herein.

In accordance with some embodiments when base station 500 is a serving base station, such as serving base station 104 (FIG. 1), network interface circuitry 502 may inform non-serving base station 106 (FIG. 1) of the ranging frame parameters for mobile station 102 (FIG. 1) to use when transmitting a ranging frame. Wireless transceiver 504 may send an initiate ranging message to mobile station 102 (FIG. 1) that includes the ranging frame parameters, and mobile station 102 (FIG. 1) may responsively transmit the ranging frame (e.g., initiate unicast ranging) within granted uplink time-slot 401 (FIG. 4) in accordance with the ranging frame parameters. In these embodiments, processing circuitry 506 may determine first timing adjustment 404 (FIG. 4) from receipt of the ranging frame from mobile station 102 (FIG. 1) within granted uplink time-slot 401 (FIG. 4). In these embodiments, network interface circuitry 502 may receive second timing adjustment 406 (FIG. 4) from non-serving base station 106 (FIG. 1) through backhaul network 110 (FIG. 1). The second timing adjustment may have been determined by non-serving base station 106 (FIG. 1) based on receipt of the ranging frame from mobile station 102 (FIG. 1). Other operations may be performed by network interface circuitry 502, wireless transceiver 504 and processing circuitry 506 described in more detail below.

Although base station 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of base station 500 may refer to one or more processes operating on one or more processing elements.

Figure 6A:
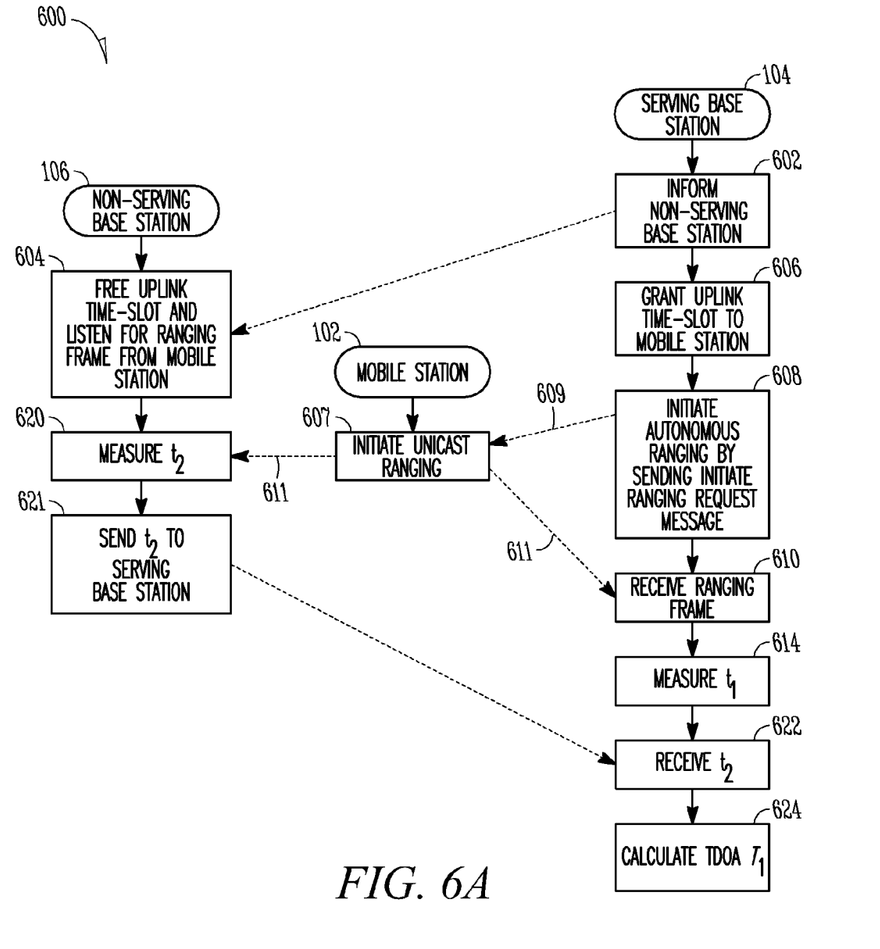
FIG. 6A illustrates a procedure for determining U-TDOA measurements in accordance with some embodiments of the present invention.

FIG. 6A illustrates a procedure for determining U-TDOA measurements in accordance with some embodiments of the present invention. In FIG. 6A, mobile station 102 may correspond to mobile station 102 (FIG. 1), serving base station 104 may correspond to serving base station 104 (FIG. 1), and non-serving base station 106 may correspond to non-serving base station 106 (FIG. 1). In FIG. 6A, base stations utilize the same set of frequencies for communicating with mobile stations. In some embodiments, procedure 600 may be performed on a regular basis and/or whenever current location information for mobile station 102 is requested.

Referring to procedure 600, in operation 602, serving base station 104 informs non-serving base station 106 of the ranging frame parameters for mobile station 102 to use when transmitting a ranging frame. In response to being informed by serving base station 104, non-serving base station 106 may perform operation 604. In operation 604, non-serving base station 106 may free an uplink time-slot, such as uplink time-slot 403 (FIG. 4A), and may listen for the transmission of a ranging frame from mobile station 102. In some embodiments, serving base station 104 may inform non-serving base station 106 of the ranging frame parameters in operation 602 using backhaul network 110 (FIG. 1). In some embodiments, the ranging frame parameters may include a frame number, start time, number of symbols, encoding rate or modulation level for the mobile station to use in generating and transmitting the ranging frame, although the scope of the invention is not limited in this respect.

In operation 606, serving base station 104 may grant an uplink time-slot, such as uplink time-slot 401 (FIG. 4A), to mobile station 102 for use when transmitting the ranging frame. The grant of an uplink time-slot may include the bandwidth, the frame number, a time-slot number, and/or a number of symbols in the time-slot, for use by mobile station 102 when transmitting the ranging frame, although the scope of the invention is not limited in this respect.

In operation 608, serving base station 104 may initiate autonomous ranging by sending initiate ranging message 609 to mobile station 102. Initiate ranging message 609 may include the ranging frame parameters. Mobile station 102 may responsively transmit ranging frame 611 within a granted uplink time-slot, such as uplink time-slot 401 (FIG. 4A), in accordance with the ranging frame parameters. In these embodiments, initiate ranging message 609 may include a timing advance, such as timing advance 402 (FIG. 4A) and may include the ranging frame parameters.

In some embodiments, in response to initiate ranging message 609, mobile station 102 may initiate unicast ranging in operation 607. In these embodiments, ranging frame 611 may comprise a RNG-REQ message, and initiate ranging message 609 may comprise a RNG-RSP message, although the scope of the invention is not limited in this respect. In some embodiments, initiate ranging message 609 may be an autonomous response message forcing mobile station 102 to send ranging frame 611, although the scope of the invention is not limited in this respect.

In operation 614, serving base station 104 may measure the first timing adjustment ($t_1$) from the receipt of ranging frame 611 from mobile station 102 within the granted uplink time-slot. The first timing adjustment may correspond to first timing adjustment 404 (FIG. 4A).

In operation 620, non-serving base station 106 may receive ranging frame 611 from mobile station 102 within the granted uplink time-slot, such as uplink time-slot 403 (FIG. 4A). As part of operation 620, non-serving base station 106 may measure the second timing adjustment ($t_2$). The second timing adjustment may be determined by the non-serving base station 106 based on receipt of the ranging frame 611 from mobile station 102. In operation 621, non-serving base station 106 may send the second timing adjustment to serving base station 104 using backhaul network 110 (FIG. 1).

In operation 622, serving base station 104 may receive second timing adjustment ($t_2$) from non-serving base station 106. In some embodiments, the second timing adjustment may be sent using backhaul network 110 (FIG. 1), although the scope of the invention is not limited in this respect.

In operation 624, serving base station 104 may calculate the first U-TDOA parameter ($T_1$) from the timing advance, the first timing adjustment and the second timing adjustment. In some embodiments, the first U-TDOA parameter ($T_1$) may be calculated using the following equation:

$T_1=(t_a+t_1)-(t_a+t_2)$, where $t_a$ is the timing advance, $t_1$ is the first timing adjustment, and $t_2$ is the second timing adjustment, although the scope of the invention is not limited in this respect. In some embodiments, the following equation may be solved for x and y to determine current location information for mobile station 102 with respect to serving base station 104:

$$T_1=(\sqrt{(x-x_1)^2+(y-y_1)^2}-\sqrt{x^2+y^2})\div C$$

In this equation, $x_1$ and $y_1$ represent the location coordinates of non-serving base station 106 in a coordinate system in which serving base station 104 is located at the origin, and C represents the speed of light. In these embodiments, serving base station 104 may know the location coordinates of non-serving base station 106. Some examples are illustrated in FIGS. 2 and 3.

In some embodiments in operation 604, non-serving base station 106 may reserve uplink time-slot 403 (FIG. 4A) for receipt of ranging frame 611 from mobile station 102 in response to being informed by serving base station 104. Uplink time-slot 403 (FIG. 4A) may be selected based on a time indicated by the ranging frame parameters provided by serving base station 104, although the scope of the invention is not limited in this respect. In some embodiments, when mobile station 102 is not currently associated with non-serving base station 106, non-serving base station 106 may refrain from receiving uplink frames from mobile stations associated with non-serving base station 106 during reserved uplink time-slot 403 (FIG. 4A). In some embodiments, mobile stations associated with non-serving base station 106 may be instructed (e.g., with a mapping frame) to refrain from transmitting to non-serving base station 106 during reserved uplink time-slot 403 (FIG. 4A), although the scope of the invention is not limited in this respect.

In some embodiments, when a second non-serving base station, such as second non-serving base station 108 (FIG. 1), is unable or unavailable to be used for determining the current location information for mobile station 102, a single non-serving base station, such as non-serving base station 106, may be used for location determination. In these embodiments, operation 624 may comprise mathematically rotating coordinate axis with respect to the serving base station 104 to place mobile station 102 one of the axis to allow calculation of the current location information for mobile station 102 by solving a simplified equation using the first U-TDOA parameter. An example of this is illustrated in FIG. 3. In these embodiments, the current location information for mobile station 102 may be calculated based primarily on the first U-TDOA parameter. In these embodiments, the equation above may be simplified by rotating x and y axis to provide a simplified equation. In some of these embodiments, the following simplified equation may be solved for x and y to determine current location information for the mobile station 102 although the scope of the invention is not limited in this respect:

$$T_1=(\sqrt{(x-x_1)^2+y_1^2}-x)\div C.$$

In some embodiments, the accuracy of the location information may be improved with the use of directive and/or sectorized antennas. In these embodiments, angle-or-arrival (AOA) and/or received signal strength, such as a receive signal strength indicator (RSSI), may be used to help improve the accuracy of location information for mobile station 102.

In some embodiments when a second non-serving base station, such as second non-serving base station 108 (FIG. 1), is used for location determination, operation 602 may also include informing second non-serving base station 108 (FIG. 1) of the ranging frame parameters that mobile station 102 will use when transmitting ranging frame 611. In these embodiments, non-serving base station 108 (FIG. 1) may perform operations, such as operations 604, 620 and 621, to determine a third timing adjustment based on receipt of ranging frame 611 from mobile station 102. In these embodiments, serving base station 104 may receive the third timing adjustment from non-serving base station 108 (FIG. 1). In these embodiments, serving base station 104 may generate a second U-TDOA parameter from the timing advance, the first timing adjustment and the third timing adjustment. In these embodiments, the current location information for mobile station 102 may be calculated based on both the first U-TDOA parameter and the second U-TDOA parameter. In these embodiments, the second U-TDOA parameter ($T_2$) may be calculated using the following equation:

$T_2=(t_a+t_1)-(t_a+t_3)$, where $t_a$ is the timing advance, $t_1$ is the first timing adjustment, and $t_3$ is the third timing adjustment, although the scope of the invention is not limited in this respect. In these embodiments, the following equations may be solved for x and y to determine the current location information for the mobile station 102:

$$T_1=(\sqrt{(x-x_1)^2+(y-y_1)^2}-\sqrt{x^2+y^2})\div C$$

$$T_2=(\sqrt{(x-x_2)^2+(y-y_2)^2}-\sqrt{x^2+y^2})\div C$$

In some embodiments, the timing advance, such as timing advance 402 (FIG. 4A), may be provided to mobile station 102 within initiate ranging message 609. In these embodiments, mobile station 102 may transmit ranging frame 611 advanced by an amount indicated by the timing advance (e.g., just prior to the reserved/granted time-slot.

In some embodiments when serving base station 104 and non-serving base station 106 use the same set of frequencies (e.g., non-orthogonal frequency channels), serving base station 104 and non-serving base station 106 may both use the same the ranging frame (i.e., ranging frame 611) to respectively determine the first and the second timing adjustments.

Figure 6B:
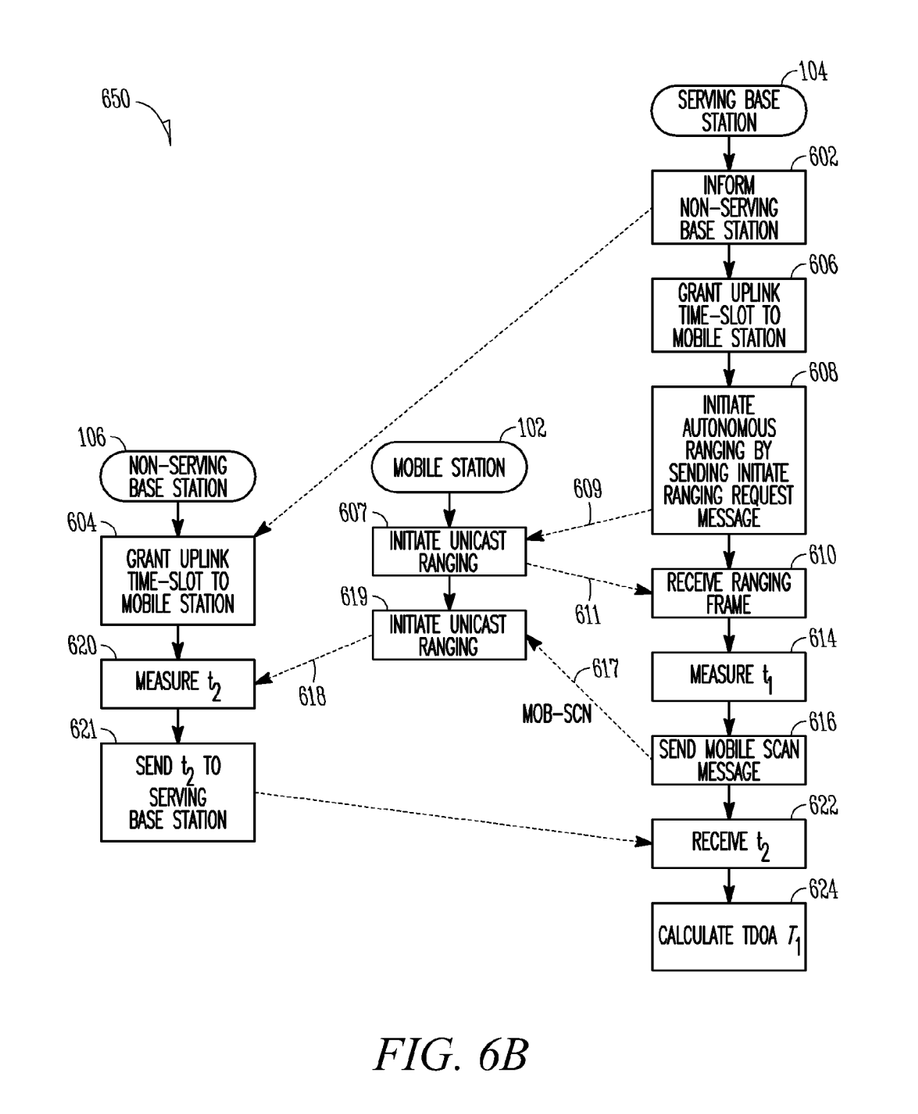
FIG. 6B illustrates a procedure for determining U-TDOA measurements in accordance with some other embodiments of the present invention.

FIG. 6B illustrates a procedure for determining U-TDOA measurements in accordance with some other embodiments of the present invention. In FIG. 6B, mobile station 102 may correspond to mobile station 102 (FIG. 1), serving base station 104 may correspond to serving base station 104 (FIG. 1), and non-serving base station 106 may correspond to non-serving base station 106 (FIG. 1). In FIG. 6B, base stations may utilize different sets of frequencies for communicating with mobile stations. In some embodiments, procedure 650 may be performed on a regular basis and/or whenever current location information for mobile station 102 is requested.

In some embodiments when serving base station 104 and non-serving base station 106 use different sets of frequencies (e.g., orthogonal frequency channels) for communicating with associated mobile stations, procedure 650 may be performed instead of procedure 600 (FIG. 6A). In these embodiments, operations 602, 606 through 614 and 620 through 624 of procedure 650 may be similar to operations 602, 606 through 614 and 620 through 624 of procedure 600 (FIG. 6A). Procedure 650 may include additional operations 616 and 619.

As illustrated in FIG. 6B, after being informed by serving base station 104, non-serving base station 106 may grant an uplink time-slot to mobile station 102 in operation 604. After receipt of the ranging frame in operation 610 and/or after measuring the first timing adjustment in operation 614, serving base station 104 may send mobile scan message 617 to mobile station 102 in operation 616. In these embodiments, mobile scan message 617 may further instruct mobile station 102 to refrain from communicating with serving base station 104 for a period of time defined in the mobile scan message 617. In response to receipt of mobile scan message 617, mobile station 102 may initiate unicast ranging in operation 619 and may send second ranging frame 618 to non-serving base station 106 on a frequency currently being used by non-serving base station 106 within the time-slot granted in operation 604.

In these embodiments in operation 620, non-serving base station 106 may determine the second timing adjustment based on receipt of the second ranging frame 618 from mobile station 102. In some of these embodiments, mobile scan message 617 may comprise a mobility-scan response (MOB_SCN-RSP) message configured in accordance with one of the IEEE 802.16 standards or proposed specification referenced below, although the scope of the invention is not limited in this respect.

In some alternative embodiments, mobile station 102 may perform a scan to identify the frequency channels used by non-serving base station 106 in response to receipt of mobile scan message 617. In these embodiments, mobile scan message 617 may include a base-station identifier of non-serving base station 106, allowing mobile station 102 to identify the frequency channels used by non-serving base station 106 and to configure second ranging frame 618 as a unicast frame, although the scope of the invention is not limited in this respect.

In some embodiments, the current location information for mobile station 102 may be updated by repeating at least some of the operations of either procedure 600 or 650. When the current location information for mobile station 102 is updated, the first timing adjustment may be provided to mobile station 102 as the timing advance for use by mobile station 102 in transmitting another ranging frame.

In some embodiments, serving base station 104 may communicate frames with mobile station 102 that comprise VoIP communications. In some of these embodiments, a request may be received from an emergency services network (e.g., a 911 network) for current location information for mobile station 102. Serving base station 104 may provide current location information based on the first U-TDOA and/or the second U-TDOA parameter to the emergency services network. In these embodiments, the current location information for mobile station 102 may be determined in response to a request from an external network, such as an emergency service network. In some alternative embodiments, the current location information for mobile station 102 may be determined on a regular basis (e.g., every 10 milliseconds), although the scope of the invention is not limited in this respect.

Although the individual operations illustrated in FIGS. 6A and 6B are illustrated and described as separate operations, one or more of the individual operations may be performed concurrently, and nothing requires that the operations be performed in the order illustrated.

Figure 7:
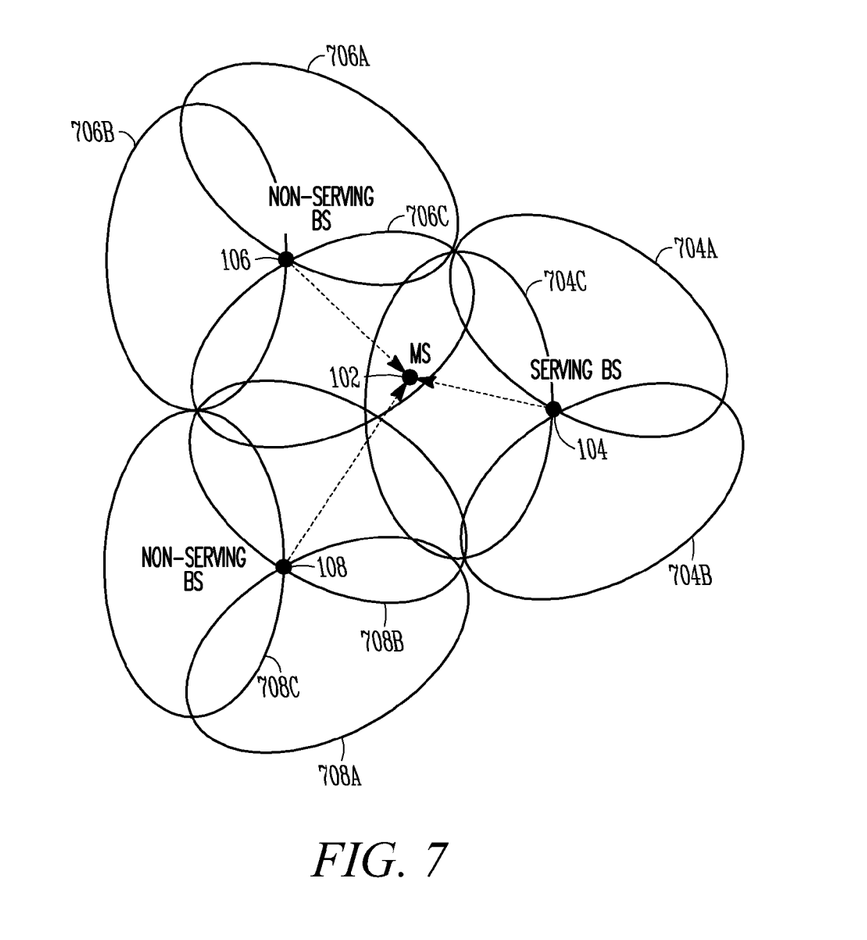
FIG. 7 illustrates a wireless access network in accordance with some embodiments of the present invention that use sectorized antennas.

FIG. 7 illustrates a wireless access network in accordance with some embodiments of the present invention that use sectorized antennas. In FIG. 7, mobile station (MS) 102 may correspond to mobile station 102 (FIG. 1), serving base station (BS) 104 may correspond to serving base station 104 (FIG. 1), non-serving base station (BS) 106 may correspond to non-serving base station 106 (FIG. 1), and non-serving base station (BS) 108 may correspond to non-serving base station 108 (FIG. 1). In these embodiments, serving base station 104 may communicate with mobile stations within sectors 704A, 704B, and 704C. Each sector of serving base station 104 may use non-interfering frequencies. In these embodiments, non-serving base station 106 may communicate with mobile stations within sectors 706A, 706B, and 706C. Each sector of non-serving base station 106 may use non-interfering frequencies. In these embodiments, non-serving base station 108 may communicate with mobile stations within sectors 708A, 708B, and 708C. Each sector of non-serving base station 108 may also use non-interfering frequencies.

As illustrated in FIG. 7, mobile station 102 is located within sector 704C of serving base station 704, and is located within sector 706C of non-serving base station 106. When sector 706C and sector 704C use the same set of frequencies, FIG. 4A and procedure 600 (FIG. 6A) may be applicable. When sector 706C and sector 704C use the different sets of frequencies, FIG. 4B and procedure 650 (FIG. 6B) may be applicable.

Referring to FIG. 1, in some embodiments, base stations 104, 106 and 108 may communicate orthogonal frequency division multiplexed (OFDM) communication signals over multicarrier communication channels. The multicarrier communication channels may be within predetermined frequency spectrums and may comprise a plurality of orthogonal subcarriers. In some embodiments, the multicarrier signals may be defined by closely spaced OFDM subcarriers. Each subcarrier may have a null at substantially a center frequency of the other subcarriers and/or each subcarrier may have an integer number of cycles within a symbol period, although the scope of the invention is not limited in this respect. In some embodiments, base stations 104, 106 and 108 may communicate in accordance with a multiple access technique, such as OFDMA, although the scope of the invention is not limited in this respect. In some embodiments, base stations 104, 106 and 108 may communicate using spread-spectrum signals, although the scope of the invention is not limited in this respect.

In some embodiments, base stations 104, 106 and 108 may be broadband wireless access (BWA) network communication stations, such as a Worldwide Interoperability for Microwave Access (WiMax) communication station, although the scope of the invention is not limited in this respect as base stations 104, 106 and 108 may be part of almost any wireless communication device.

In some embodiments, mobile station 102 (FIG. 1) may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some wireless access network embodiments, the frequency spectrum for the communication signals utilized by base stations 104, 106 and 108 and mobile station 102 may comprise frequencies between 2 and 11 GHz, although the scope of the invention is not limited in this respect. In some embodiments, base stations 104, 106 and 108 and mobile station 102 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware and software. Some embodiments of the invention may also be implemented as instructions stored on a machine-readable medium, which may be read and executed by at least one processor to perform the operations described herein. A machine-readable medium may include any mechanism for storing information in a form readable by a machine (e.g., a computer).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A serving base station configured to perform uplink time difference of arrival (U-TDOA), comprising:
processing circuitry to:
measure a first timing adjustment by receipt of a first upload (UL) burst from a mobile station in a first granted slot of a first orthogonal frequency division multiple access (OFDMA) frame; and
determine a position of the mobile station based at least in-part on the first timing adjustment received by the serving base station, a second timing adjustment from a non-serving base station, a third timing adjustment from a second non-serving base station, and a fourth timing adjustment from a third non-serving base station; and
network interface circuitry to receive the second timing adjustment from the non-serving base station, the third timing adjustment from the second non-serving base station, and the fourth timing adjustment from the third non-serving base station, the second timing adjustment being measured by the non-serving base station from receipt of a second UL burst from the mobile station in a second granted slot of a second OFDMA frame.

2. The serving base station of claim 1, wherein the serving base station and the non-serving base station employ frequency diversity.

3. The serving base station of claim 1, wherein the serving base station operates synchronously with the non-serving base station.

4. The serving base station of claim 1, wherein the UL burst from the mobile station is initiated in response to a request from an external network.

5. The serving base station of claim 1, wherein the processing circuitry calculates the U-TDOA based at least upon a difference between the first timing adjustment and the second timing adjustment.

6. A serving base station configured to perform uplink time difference of arrival (U-TDOA), comprising:
processing circuitry to:
measure a first timing adjustment by receipt of an upload (UL) burst from the mobile station in a granted slot of an orthogonal frequency division multiple access (OFDMA) frame; and
determine a position of the mobile station based at least in-part on the first timing adjustment received by the serving base station, a second timing adjustment from a non-serving base station, a third timing adjustment from a second non-serving base station, and a fourth timing adjustment from a third non-serving base station; and
network interface circuitry to receive the second timing adjustment from the non-serving base station, the third timing adjustment from the second non-serving base station, and the fourth timing adjustment from the third non-serving base station, the second timing adjustment being measured by the non-serving base station from receipt of the UL burst from the mobile station in the granted slot of the OFDMA frame.

7. The serving base station of claim 6, wherein the serving base station and the non-serving base station operate on the same frequency band.

8. The serving base station of claim 6, wherein the serving base station operates synchronously with the non-serving base station.

9. The serving base station of claim 6, wherein the UL burst from the mobile station is initiated in response to a request from an external network.

10. The serving base station of claim 6, wherein the processing circuitry calculates the U-TDOA based at least upon a difference between the first timing adjustment and the second timing adjustment.

* * * * *